(12) United States Patent
Mourier et al.

(10) Patent No.: US 8,608,961 B2
(45) Date of Patent: Dec. 17, 2013

(54) METHOD FOR AFFINITY CHROMATOGRAPHY OF ANTITHROMBIN III

(75) Inventors: Pierre Mourier, Paris (FR); Gerald Perret, Paris (FR)

(73) Assignee: Aventis Pharma S.A., Paris (FR)

( * ) Notice: Subject to any disclaimer, the term of this patent is extended or adjusted under 35 U.S.C. 154(b) by 330 days.

(21) Appl. No.: 12/020,787

(22) Filed: Jan. 28, 2008

(65) Prior Publication Data

US 2008/0188650 A1 Aug. 7, 2008

Related U.S. Application Data

(63) Continuation of application No. PCT/FR2006/001820, filed on Jul. 26, 2006.

(30) Foreign Application Priority Data

Jul. 27, 2005 (FR) ..................... 05 07986

(51) Int. Cl.
*B01D 15/08* (2006.01)
*G01N 30/02* (2006.01)
*C02F 1/28* (2006.01)

(52) U.S. Cl.
USPC .......... 210/198.2; 210/656; 422/70; 73/61.52

(58) Field of Classification Search
USPC ............................ 210/656, 198.2
See application file for complete search history.

(56) References Cited

U.S. PATENT DOCUMENTS

| 4,415,631 A | 11/1983 | Schutijser et al. |
| 6,582,603 B1 | 6/2003 | Suzuki et al. |

FOREIGN PATENT DOCUMENTS

WO WO 2007/012754 A1 2/2007

OTHER PUBLICATIONS

Bjorklund et al. Characterisation of silica-based heparin affinity sorbents from equilibrium binding studies on plasma fractions containing thromin. Journal of Chromatography A. vol. 762 (1997) p. 113-133.*
Onoue et al. Novel approach for preparation of heparins specific to factor Xa using affinity chromatography coupled with synthetic antithrombin III-related peptides. Peptides. vol. 24 (2003) p. 821-826.*
Goncharova, et al., Preparation of sorbent for haemo:sorption SU 1708400 Patent Abstract, 30, Jan. 1992.
Hook, et al., Anticoagulant activity of heparin: Separation of high-activity and low-activity heparin species by affinity chromatography on immobilized antithrombin, Febs Letters, vol. 66, Issue 1, Jul. 1, 1976, pp. 90-93.
Hosokawa, et al., JP 2005-013156 Patent Abstract, Dec. 5, 2003.

* cited by examiner

*Primary Examiner* — Katherine Zalasky
(74) *Attorney, Agent, or Firm* — Scully, Scott, Murphy & Presser, P.C.

(57) ABSTRACT

The present invention is directed to an affinity chromatography column comprising the antithrombin III (ATIII) protein bound to a solid support, characterized in that:
 a. the ATIII protein is the wild-type protein or a variant thereof,
 b. the ATIII protein has been first activated by incubation with an unmodified low-molecular-weight heparin (LMWH) rich in active species, and
 c. the ATIII protein is covalently bound to a resin in a ratio of less than approximately 2 mg of protein per ml of hydrated resin.

The invention is also directed to the use of the aforesaid column for purifying species having an affinity for ATIII in a sample comprising species having affinity and not having affinity for ATIII.

7 Claims, 2 Drawing Sheets

METHOD FOR AFFINITY CHROMATOGRAPHY OF ANTITHROMBIN III

FIELD OF THE INVENTION

The present invention relates to an affinity chromatography column comprising the ATIII protein bound to a solid support.

BACKGROUND OF THE INVENTION

Heparins, which are mixtures of sulfated mucopolysaccharides of animal origin, are biologically active agents of the glycosaminoglycan family that have particularly useful anticoagulant properties. They are constituted of sulfated linear polysaccharide chains that are very heterogeneous by virtue of their sizes. The average weight of heparins is approximately 15 000 Da (origin: porcine mucus).

Low-molecular-weight heparins (LMWHs) and very low-molecular-weight heparins (VLMWHs) are prepared by cleavage of the long heparin polysaccharide chains into shorter low molecular weight chains. The terms "LMWH" and "VLMWH" are thus intended to mean chains whose molecular weight is respectively between 3000 and 6500 Da and between 1500 and 3000 Da.

Antithrombin III (ATIII) (Chandra et al., 1983, *Proc. Natl. Acad. Sci. U.S.A.*, 80: 1845-1848) is a specific serpin which has a weak inhibitory activity on serine proteases controlling clotting. This action is clearly increased in the presence of heparin which binds and activates ATIII. In particular, the binding to heparin brings about a set of conformational changes in the protein culminating in the adoption of a conformation highly favorable to interaction with the target serine proteases. When ATIII is in the activated conformation, the interaction with the molecule of heparin or derivative which initiated the conformational change is clearly strengthened.

The interaction between heparin and ATIII is due to a specific pentasaccharide sequence. Now, only one-third of the polysaccharide strands have the specific sequences allowing a stable interaction with ATIII. Heparin preparations and derivatives are therefore heterogeneous with regard to the affinity for ATIII. It is important to be able to enrich a population of oligosaccharides in species having affinity for ATIII, such an enrichment being capable of significantly increasing the anticoagulation activity of this population.

A method of ATIII affinity chromatography for separating the heparin-affinity and heparin-non-affinity fractions is described in Hook et al. (1976, *FEBS Lett.*, 66: 90-93). Other methods have been published, but reiterate the essential points of the method of Hook et al. (Hopwood et al., 1976, *FEBS Lett.*, 69: 51-54; Denton et al., 1981, *Anal. Biol.*, 118: 388-391; Pixley & Danishefsky, 1982, *Thromb. Res.*, 26: 129-133). According to this method, ATIII is grafted, in the presence of acetylated heparin, onto CNBr-activated Sepharose B resin. The purpose of using heparin is to prevent any grafting at the level of the heparin-binding site of ATIII.

This technique has two important limitations.

First of all, the heparin used for binding ATIII is an acetylated heparin, so as to avoid the risk of competition with the hexamine $NH_2$ residues. Now, the acetylation of heparin is reflected by a considerable decrease in its affinity and therefore in its protective capacity with respect to the binding site, hence a decrease in the number of ATIII molecules capable of binding the species having affinity.

Secondly, in view of the concentration of ATIII used (approximately 7 mg of protein/ml of hydrated resin), there is a high risk of steric hindrance between the polysaccharide molecules capable of binding to ATIII during a purification of species having affinity for ATIII.

SUMMARY OF THE INVENTION

The present invention is directed to an affinity chromatography column comprising the antithrombin III (ATIII) protein bound to a solid support, characterized in that:
a. the ATIII protein is the wild-type protein or a variant thereof,
b. the ATIII protein has been first activated by incubation with an unmodified low-molecular-weight heparin (LMWH) rich in active species, and
c. the ATIII protein is covalently bound to a resin in a ratio of less than approximately 2 mg of protein per ml of hydrated resin.

The use of the aforesaid column is especially useful as it has higher and more selective affinity with respect to the species having a desired affinity thereto, and facilitates the separation of species of large size. Thus, the invention is also directed to the use of the aforesaid column for purifying species having an affinity for ATIII in a sample comprising species having affinity and not having affinity for ATIII.

DETAILED DESCRIPTION OF THE INVENTION

Definitions

Figure 1:
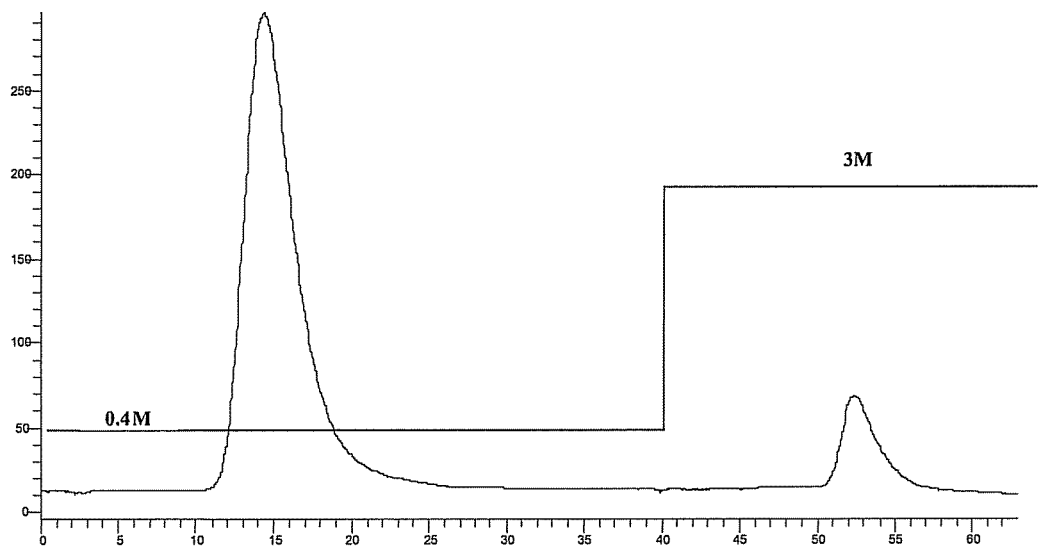
FIG. 1: Chromatogram of a separation of enoxaparin on ATIII affinity chromatography.

The term "unmodified LMWH" is intended to mean an LMWH which has not undergone a chemical or enzymatic modification after preparation and, in particular, which is not acetylated. The expression "LMWH rich in active species" is intended to mean an LMWH rich in oligosaccharides having affinity for ATIII.

The term "resin" is intended to mean, according to the invention, a chemically inert macromolecular support onto which ATIII is grafted. These supports comprise, inter alia, and in a nonlimiting manner, agarose beads, polyacrylamide-agarose beads, porous glass beads, polyvinyl beads or polymethacrylate beads, onto which ATIII is grafted according to the manufacturers' indications or methods well known to those skilled in the art, including in particular grafting methods with cyanogen bromide and with hydrazine. It is clearly understood that preactivated resins may also be used.

Embodiments

According to a most particularly advantageous embodiment of the invention, the resin used is Sepharose and the grafting technique used is that of cyanogen bromide grafting.

The affinity chromatography column according to the invention has a double advantage.

Firstly, the use of an unmodified LMWH for protecting the binding site of ATIII makes it possible to fix the protein in an activated conformation. In this conformation, ATIII exhibits a significantly higher and more selective affinity with respect to the species having affinity than ATIIIs bound via the primary amines without prior activation.

Secondly, the low concentration of ATIII allows interactions with the species having affinity without steric hindrance between them. This property of the invention is particularly advantageous when the intention is to separate species of large size.

In order for all the ATIII molecules to be activated, it is preferable to use a saturating amount of unmodified LMWH rich in species having affinity.

According to an advantageous embodiment of the invention, the ratio between the amounts of ATIII-binding sites present in LMWH and of ATIII molecules is between approximately 5 and approximately 15. More specifically, the subject of the invention is an affinity chromatography column as defined above, characterized in that this ratio is approximately 10.

A subject of the invention is most particularly an affinity chromatography column, characterized in that enoxaparin is used as LMWH for protecting the ATIII binding site.

As explained above, the invention also has the advantage of allowing better accessibility to ATIII by adjusting the concentration of protein that can be grafted onto the resin.

According to another advantageous embodiment, a subject of the invention is an affinity chromatography column, characterized in that the ATIII/resin ratio is between approximately 0.5 and approximately 1.5 mg of protein per ml of resin. For example, for a cyanogen bromide-activated Sepharose B resin (Sigma), this corresponds to a range of approximately 1.75 mg to 5.25 mg of protein per g of dry resin (according to the supplier's data, 1 g of dry resin gives approximately 3.5 ml of resin after hydration).

Thus, the affinity chromatography column according to the invention has a greater capacity and a greater selectivity than the columns described in the prior art.

Situations occur where it may be desirable to purify species having affinity for ATIII from a mixture of species having affinity and not having affinity. The expression "species having affinity for ATIII" is intended to mean any molecule capable of binding specifically to ATIII. For example, it may be desired to enrich a population of heparin oligosaccharides in species having affinity. It may also be advantageous, for example, to increase the titer of a solution of polyclonal antibodies against ATIII.

The affinity chromatography column according to the invention may thus be used for purifying species having affinity for ATIII from a mixture. A subject of the invention is thus also a method for purifying species having affinity for ATIII in a sample comprising species having affinity and not having affinity for ATIII, said method comprising:

a. introducing said sample into the affinity chromatography column for the ATIII protein, said column being first equilibrated in an appropriate saline buffer;
b. washing the species not specifically retained from said column with an appropriate saline washing buffer, and
c. eluting the species specifically retained from said column using an appropriate saline eluting buffer.

In particular, according to a most particularly advantageous embodiment, the species having affinity that are purified by means of the method according to the invention are oligosaccharides constituting heparins and their derivatives.

The elution of the various species may, for example, be followed by measuring the absorbance for various fractions using a spectrophotometer. The wavelength used will be suitable for the nature of the purified species. For example, if oligosaccharides are purified, the length used will be 232 nm; if proteins are purified, it will be 280 nm.

The composition of the elution fractions may then be analyzed according to methods well known to those skilled in the art. Thus, if the fractions analyzed comprise oligosaccharides, those skilled in the art may use the analytical methods described in the prior art: for example and in a nonlimiting manner, capillary electrophoresis, MALDI-TOF mass spectrophotometry, high performance liquid chromatography. Those skilled in the art may also use a biological assay, such as the factor Xa inhibition assay.

EXAMPLES

The following examples illustrate the invention without however limiting it.

Example 1

Preparation and Use of the Column

1. Preparation of the column 10 mg of ATIII are reconstituted in 2 ml of water for injectable preparation, which is subsequently taken up in 18 ml of coupling buffer (0.2M $NaHCO_3$, 0.5M NaCl, pH=8) at a final concentration of 0.5 mg/ml (8.6 µM). 34.4 mg of enoxaparin are added to the solution, at a final concentration of 1.4 mg/ml (215 µM).

The solution is mixed in a 1:2 ratio with CNBr-activated Sepharose B resin (Sigma) prepared according to the manufacturer's indications, and is then gently stirred overnight in the cold. The whole is subsequently transferred into the blocking buffer (volume to volume) and is stirred for 16 h.

The resin is poured into a thermostatted XK16 column (Amersham) equipped with 2 pistons. After decanting, it is washed 4 to 5 times by alternating between blocking buffer and washing buffer.

After this washing, the column is rinsed thoroughly with 10 M Tris-HCl buffer, pH=7.4; 3M NaCl, in order to remove the enoxaparin molecules complexed with the ATIII.

Finally, the column is equilibrated with 10 mM Tris HCl buffer, pH=7.4; 0.4M NaCl.

2. Separation of Enoxaparin Species Having Affinity by Affinity Chromatography

A solution of enoxaparin at 1 mg/ml in 10 mM Tris HCl buffer, pH=7.4; 0.4M NaCl is injected into the column. The column is thoroughly washed with the same buffer and then the elution is carried out with 10 mM Tris HCl buffer, pH=7.4; 3M NaCl.

The behavior of the species having affinity is followed with a diode array UV detector (HP 1100) by measuring the absorbance of the fractions at 232 nm. As shown in FIG. 1, the species having affinity are specifically retained on the column and are eluted only in the presence of 3M NaCl.

Example 2

Comparison with Another Affinity Chromatography Column

1. Capacity

Two columns are prepared with an identical grafting protocol, except for the protecting agent:
Column 1: Protection during grafting with 40 mg of enoxaparin
Column 2: Protection during grafting with 120 mg of heparin.

The difference in amount used in the protection is justified by the difference in average molecular mass (a ratio of approximately 3.4).

In order to determine the capacity of the columns, 400 µg of an LMWH prepared as described in example 7 of international application WO 02/08295 are injected into each column, in a 10 mM Tris-HCl buffer, pH=7.4; 0.2M NaCl, at a flow rate=0.5 ml/min. The elution is carried out with 3M NaCl.

The separation of the various polysaccharide species is followed with a diode array UV detector (HP 1100) by measuring the absorbance of the fractions at 232 nm.

Figure 2:
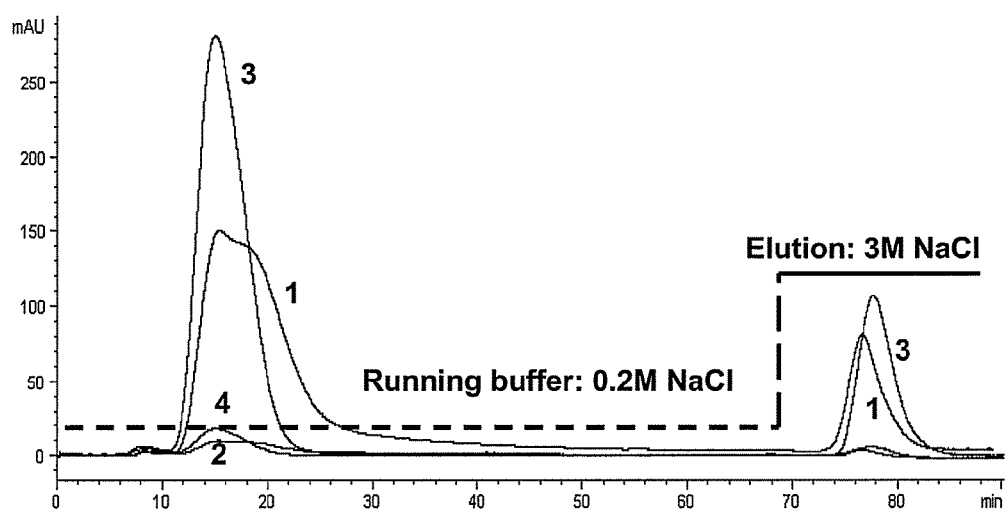
FIG. 2: Chromatogram of a separation of Enoxaparine® on ATIII affinity chromatography. Curve 3 is the injection of LMWH onto column 1 (Enoxaparine® protection), curve 2 the injection of buffer onto column 1 (Enoxaparine® protection), curve 1 the injection of LMWH onto column 2 (heparin protection), curve 4 the injection of buffer onto column 2 (heparin protection).

A separation is observed on the two columns, but the separation profile is different (FIG. 2). In particular, the peak of the species not retained is to a large extent trailing on column 2 (protection: heparin). Furthermore, the amount eluted with column 2 (protection: heparin) appears to be lower than that eluted with column 1 (protection: enoxaparin).

In order to verify quantitatively this qualitative result, the percentage of species retained is calculated by means of the integration of the areas, performed on the HP Chemstation® software according to the formula:

% species retained=area of the elution peak/(area of the peak of the species not retained+area of the peak of the species retained).

In the knowledge that the percentage of species having affinity in a hexasaccharide fraction of the LMWH used is estimated at 22-24%, an approximative determination of the capacity was carried out by varying the amount injected. The capacity then corresponds to the maximum amount of LMWH injected for which this percentage of 22-24% is obtained at elution.

It was thus found that the capacity of column 1 (protection: enoxaparin) is 115.8 µg and that the capacity of column 2 (protection: heparin) is 64 µg.

Selectivity

The term "selectivity" defines herein the ability of the resins to distinguish, during separation, the polysaccharide species having affinity from those not having affinity.

In order to carry out these analyses, injections of LMWH in an amount less than the previously determined capacity were performed.

a. Column 1 (Protection: Enoxaparin),

The fractions having affinity and not having affinity after several injections of 427 µg of LMWH were combined and analyzed by CTA-SAX HPLC (MOURIER et al., 2004, *Anal. Biochem.*, 332: 299-313). The fraction having affinity that is obtained is pure and complete, in that it does not contain any species not having affinity and in that it exhibits all the hexasaccharides having affinity. The fraction not having affinity is, in a complementary manner, completely depleted of species having affinity.

In order to corroborate the structural analysis, the anti-Xa activities of the fractions having affinity and not having affinity, separated in column 1 (protection: enoxaparin), were determined.

That of the fraction having affinity is equal to 818±10 IU/mg; for comparison, the activity of the hexasaccharide ΔUA-(1→4)α-GlcNAc(6S)-(1→4)β-GlcA-(1→4)α-GlcNS(NS,3,6S)-(1→4)β-IdA2S-(1→4)α-GlcNS(NS,6S) is approximately 650-700 IU/mg. On the other hand, it was completely impossible to detect an anti-Xa activity in the fractions not having affinity.

The biological analyses carried out on the fractions are therefore entirely in agreement with the structural analyses.

b. Column 2 (Protection: Heparin)

A similar study was carried out for column 2 (protection: heparin). In order to optimize the functioning of this resin, the amounts injected were nevertheless smaller (60 µg), from the point of view of the previously determined capacity.

The fraction having affinity is not as pure as that obtained with column 1 (protection: enoxaparin). The presence of hexasaccharides not having affinity is in fact observed, in particular the presence of highly sulfated hexasaccharides such as ΔUA2S-(1→4)α-GlcNS(NS,6S)-(1→4)β-IdA2S-(1→4)α-GlcNS(NS,6S)-(1→4)β-IdA2S-(1→4)α-GlcNS(NS,6S) or ΔUA2S-(1→4)α-GlcNS(NS,6S)-(1→4)β-IdA2S-(1→4)α-GlcNS(NS,6S)-(1→4)β-GlcA-(1→4)α-GlcNS(NS,6S), in a not insignificant amount.

Furthermore, species having affinity are found in the fraction not having affinity, in particular the predominant species having affinity: ΔUA-(1→4)α-GlcNAc(6S)-(1→4)β-GlcA-(1→4)α-GlcNS(NS,3,6S)-(1→4)β-IdA2S-(1→4)α-GlcNS(NS,6S).

The titers of the anti-Xa activities of the fractions having affinity and not having affinity confirm the structural analyses. In fact, the fractions having affinity exhibit an anti-Xa activity which is only 565±45 IU/mg. Moreover, a not insignificant residual activity of approximately 15 IU/mg is found in the fraction not having affinity. This activity is a reflection of the residual species having affinity that are in the fraction not having affinity, demonstrated during the structural analysis.

It is therefore clear that the selectivity of column 1 (enoxaparin) is greater than that of column 2 (heparin).

The invention claimed is:

1. An affinity chromatography column comprising antithrombin III (ATIII) protein bound to a solid support, made by the following process:
   a. providing the ATIII protein as the wild-type protein or a variant thereof,
   b. activating the ATIII protein by incubation with an unmodified low-molecular-weight heparin (LMWH) rich in active species,
   c. covalently binding the ATIII protein to a resin in a ratio of less than approximately 2 mg of protein per ml of hydrated resin.

2. The column as defined in claim 1, wherein the ratio between the amounts of ATIII-binding sites present in LMWH and of ATIII molecules is between approximately 5 and approximately 15.

3. The column as defined in claim 2, wherein the ratio between the amounts of ATIII-binding sites present in LMWH and of ATIII molecules is approximately 10.

4. The column as defined in claim 1, wherein the LMWH is enoxaparin.

5. The column as defined in claim 1, wherein the ATIII/resin ratio is between 0.5 and 1.5 mg of protein per ml of resin.

6. A method for purifying species having affinity for ATIII in a sample comprising species having affinity and not having affinity for ATIII, said method comprising:
   a. introducing said sample into the affinity chromatography column according to claim 1, said column being first equilibrated in an appropriate saline buffer;
   b. washing the species not specifically retained from said column with an appropriate saline washing buffer, and
   c. eluting the species specifically retained from said column with an appropriate saline eluting buffer.

7. The method for purifying species having affinity for ATIII as claimed in claim 6, wherein said species are oligosaccharides.

* * * * *